United States Patent
French et al.

[11] 3,883,340
[45] May 13, 1975

[54] GLASS MELTING METHOD

[75] Inventors: William George French, Plainfield; Arthur David Pearson, Bernardsville; Arthur Richard Tynes, Red Bank, all of N.J.

[73] Assignee: Bell Telephone Laboratories, Incorporated, Murray Hill, N.J.

[22] Filed: Mar. 29, 1973

[21] Appl. No.: 345,979

[52] U.S. Cl. .................. 65/134; 65/32; 65/136; 65/178
[51] Int. Cl. .................. C03b 5/00; C03b 5/18
[58] Field of Search ..... 65/134, 178, 136, 32, 99 A, 65/157

[56] References Cited
UNITED STATES PATENTS

| | | | |
|---|---|---|---|
| 2,975,224 | 3/1961 | Burch | 65/136 X |
| 3,233,993 | 2/1966 | Weidel | 65/178 X |
| 3,367,761 | 2/1968 | Zitkus | 65/134 X |
| 3,451,794 | 6/1969 | Patterson | 65/157 |
| 3,607,175 | 9/1971 | Robinson | 65/99 A X |
| 3,656,924 | 4/1972 | Chapman et al. | 65/134 X |
| 3,656,927 | 4/1972 | Lawrenson et al. | 65/99 A |
| 3,688,812 | 4/1972 | Fredericks | 65/34 X |
| 3,743,492 | 7/1973 | Ogiba | 65/32 |

Primary Examiner—S. Leon Bashore
Assistant Examiner—Kenneth M. Schor
Attorney, Agent, or Firm—A. N. Friedman; G. S. Indig

[57] ABSTRACT

The disclosed glass melting method makes use of an apparatus incorporating a skirted lid fixed to a stirring rod with a hollow stem. The lid fits over the melt container leaving a limited space between the lid and the container. The continual introduction of a gas into the container through the hollow stem of the stirring rod allows control of the atmosphere over the melt during the homogenization and conditioning steps in the formation of the glass. The continual outflow of gas between the container and the lid skirt reduces the possibility of contamination of the melt from the furnace atmosphere.

3 Claims, 2 Drawing Figures

3,883,340

GLASS MELTING METHOD

BACKGROUND OF THE INVENTION

1. Field of the Invention

The invention is in the field of glass making.

2. Brief Description of the Prior Art

Through continual improvement in fabrication technique the ancient art of glass making has kept pace with modern technology. The use of glass fibers as an optical communication medium, is under current investigation and the production of glasses whose properties are suited to this use is the subject of current work. It has been recognized in the past that the production of glasses for some purposes is aided by the control of the atomsphere in the glass melting furnace. One prior worker (R. A. Weidel, U.S. Pat. No. 3,233,993, issued Feb. 8, 1966) discloses the maintenance of a reducing atmosphere in his glass melting furnace by enclosing the furnace and introducing suitable gases. Such an apparatus while suitable for many purposes is still subject to some contamination of the furnace atmosphere by dust and gases driven out of the furnace walls by the high temperatures needed for glass fusion.

SUMMARY OF THE INVENTION

In the inventive glass making apparatus the atmosphere in the glass melting crucible is controlled independently of the furnace atmosphere so as to control the chemistry of the glass (e.g., the valence state of impurity ions) and in such a manner as to greatly reduce the possibility of the introduction of contaminates into the glass from the furnace atmosphere. In order to accomplish this independent control the crucible is provided with a skirted lid which overlaps the crucible wall so as to leave a narrow space between the lid skirt and the crucible wall. The lid is provided with a hollow stemmed stirring rod through which the desired atmosphere is continually introduced into the space above the melt. The gases, thus introduced, continually sweep out of the crucible through the narrow space between the crucible wall and the lid skirt. The velocity of this continual flow of gas is maintained high enough to greatly reduce the backflow of dust and gas from the furnace atmosphere into the crucible. During this processing the molten glass is stirred by rotating the stirring rod relative to the crucible. In a preferred embodiment the lid is fixed to the stirring rod to form a lid assembly. Such an apparatus has been used in the production of glass which has subsequently been drawn into fibers for optical communications studies.

DETAILED DESCRIPTION OF THE INVENTION

Figure 1:
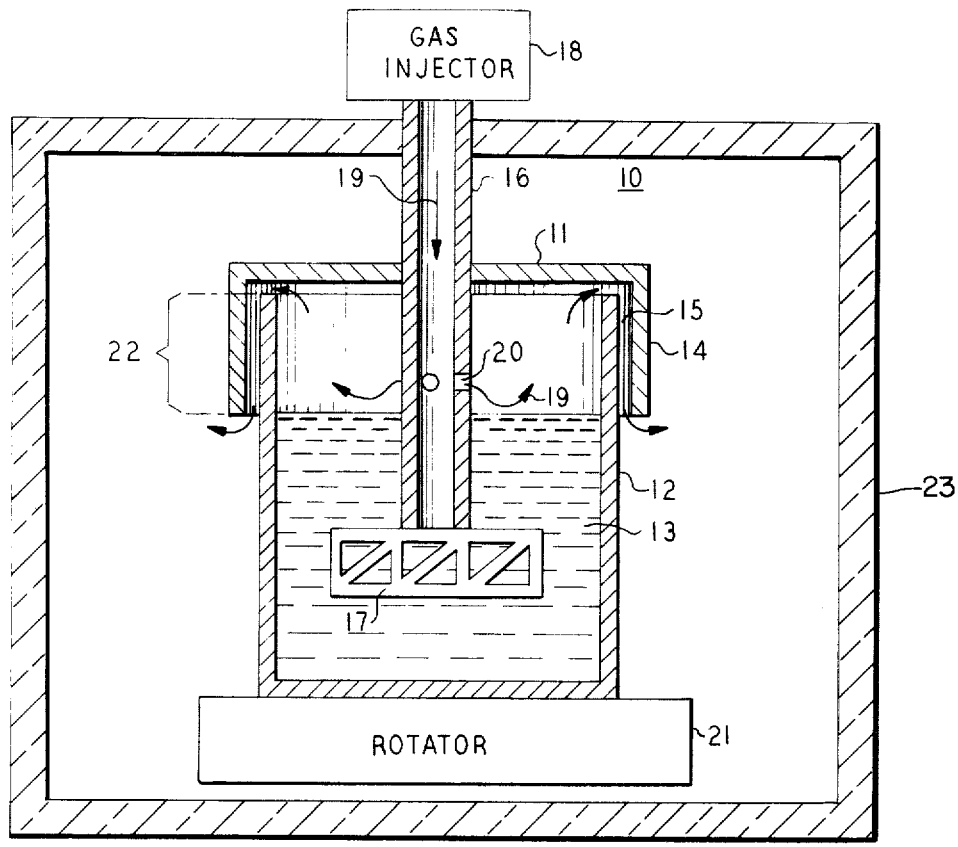
FIG. 1 is an elevational view in section (partially schematic) of an exemplary glass melting apparatus with a rotator fixed to the crucible and a continual outflow of gas from the crucible.

FIG. 1 shows a glass forming apparatus 10 with a skirted lid 11 suspended over a crucible 12 with a circularly cylindrical upper end. The crucible contains a molten glass charge 13. The skirt 14 of the lid 11 is wide enough to provide a space 15 between the outer wall of the crucible 12 and the inner wall of the skirt 14. Extending through the lid 11 is a tube 16 which extends down into the molten glass charge and terminates in a stirring member 17. During operation a gas injector 18 introduces a continual stream of gas 19 into the tube. The gas 19 flows through holes 20, provided in the tube 16, between the lid 11 and lower end of the tube 16, into the space above the glass charge 13. The content and purity of this gas 19 is controlled so as to provide the desired atmosphere over the glass charge 13.

The continual introduction of gas into the tube 16 provides a continual stream of gas passing out of the crucible 12 through the space 15 between the outer wall of the crucible and the inner wall of the lid skirt 14. The glass charge 13 is stirred during processing by the stirring member 17 as the rotator 21 provides relative rotation between the crucible 12 and the stirrer-lid assembly 11, 16, 17. The arrangement shown in FIG. 1, in which the lid 11 is supported above the crucible 12, is preferred when the crucible and lid are made of metals such as platinum. Such metals have shown a tendency to weld together if they touch at temperatures as high as the 1500°C met in glass processing. The quantity of gas 19 injected into the rod 16 is chosen to provide an average linear velocity of gas flow in the space 15 which is preferably greater than 10 feet per minute. This velocity is sufficient to prevent the back streaming of most particulate matter so long as the overlap 22 between the skirt 14 and crucible 12 is more than ¼ of an inch. The maintenance of an averaging linear velocity greater than 50 feet per minute is preferable and sufficient to prevent substantial backstreaming of most gaseous species.

Figure 2:
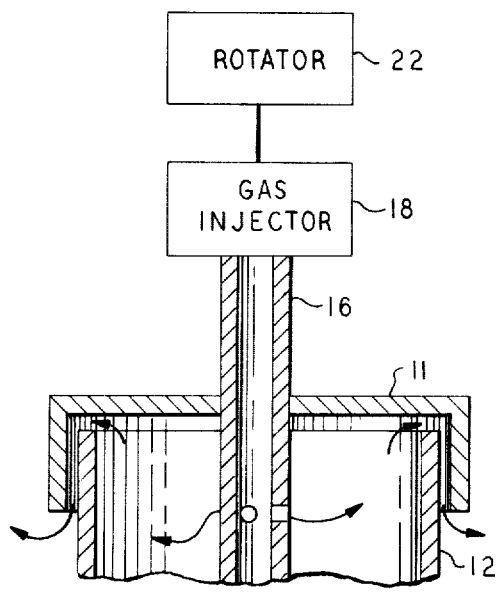
FIG. 2 is an elevational view in section (partially schematic) of the upper portion of an apparatus similar to that of FIG. 1, with a rotator fixed to the lid assembly.

FIG. 2 shows the upper portion of an exemplary glass forming apparatus in which relative rotation of the stirrer-lid assembly 11, 16, 17 and the crucible 12 is provided by a rotator 22 connected to the stirrer-lid assembly.

The composition of the atmosphere over the glass melt can be important in the manufacture of glass for optical transmission lines. The provision of an oxidizing or a reducing atmosphere can be used to control the valence state of impurity ions contained in the glass so as to move the optical absorption of these ions out of the spectral region in which the glass transmission line is to be used. For example, iron in the doubly ionized state absorbs strongly in the infrared while iron in the triply ionized state absorbs strongly in the ultraviolet but not in the infrared. If transmission in the infrared is desired and iron is the dominant impurity, the provision of an oxidizing atmosphere is indicated in order to convert doubly ionized iron into glass to the triply ionized state.

EXAMPLES

A glass melting apparatus was constructed and used in the following manner. A platinum crucible was made for holding the molten glass in the form of a right circular cylinder 6 inches high and 4 inches in diameter. A skirted lid was formed of platinum whose diameter was chosen so as to leave a ¼ inch space between the lid-skirt and the crucible wall. The depth of the skirt was 2 inches and in operation the overlap between the skirt and the crucible was at least 1 ½ inches. This large overlap was chosen so that the stirrer (see below) could be withdrawn from the molten glass and still maintain a ¼ inch overlap between the skirt and the crucible wall. A platinum-rhodium tube three-eights inch outer diamater 0.05 inch wall thickness) extended through the lid and was fixed to the lid in a gas tight fashion at a point 1 inch below the lid the platinum-rhodium tube terminated and was fixed to a platinum-tube terminated at the lower end by a perforated stirring paddle. In operation, the junction of the platinum-rhodium tube and the platinum rod was above the surface of the molten glass charge. In usual operation sufficient starting materials to form a molten glass charge approximately 2 inches deep was introduced into the crucible. The crucible was placed in a furnace 23 and the stirrer-lid assembly was suspended over the crucible so as to maintain at least ¼ inch overlap between the lid skirt and the crucible as the temperature of the furnace was raised to and held at temperatures of the order of 1500°C. Then the crucible was raised so as to immerse the stirring paddle in the glass melt. Filtered nitrogen gas was introduced into the upper end tube in a quantity of approximately 60 liters per minute, this gas flow provided an average linear velocity of gas flow in the space between the lid skirt and the crucible of approximately 100 feet per minute. The molten glass was stirred by rotating the stirrer-lid assembly while keeping the crucible fixed relative to the furnace.

In the formation of exemplary compound silicate glass (e.g., containing oxides of Na, Ca and Si) sodium carbonate, calcium carbonate and silicon dioxide powders are mixed in proportion to yield a glass with a softening point between 550° and 650°C (e.g., 23 mole percent $Na_2O$, 5 mole percent CaO and 72 mole percent $SiO_2$). The softening temperature is defined as that temperature at which the viscosity of the glass is $10^{7.6}$ poise. The powders are thoroughly mixed and melted in the platinum crucible r-f heated to between 1000° and 1200°C, temperatures high enough to convert the carbonates to oxides. The crucible is then placed in the furnace and covered by the lid assembly. The furnace temperature is raised to from 1300° to 1600°C. Above 1300°C the glass is sufficiently low in viscosity to be thoroughly stirred. Above 1600°C the platinum crucible deteriorates too rapidly. When the glass has come to temperature stirring is started. In an exemplary melt run, the stirrer was rotated at a rate of 20 rpm and the rotation was reversed every 30 seconds. The glass is stirred at this temperature for from 5 to 20 hours. Five hours is sufficient to produce substantial homogenization. Little further homogenization is produced after 20 hours. After the stirring is stopped, the stirrer is withdrawn from the melt by lowering the crucible but leaving at least ¼ inch overlap between the lid skirt and the crucible wall. The melt is allowed to stand at substantially the same temperature for an additional time from ½ to 5 hours allowing the larger of the entrained bubbles to rise to the surface and burst. One-half hours is sufficient time to accomplish substantial removal of the larger bubbles, while little further removal is accomplished after 5 hours. The temperatures of the furnace is then reduced approximately 200° and the melt allowed to stay at that temperature for from ½ to 5 hours. During this time the smaller bubbles are absorbed into the glass. This process is known as "conditioning". Substantial absorption is accomplished after ½ hour while little further absorption is accomplished after 5 hours. The crucible is removed from the furnace and covered, permitting the glass to cool to room temperature. The glass is removed from the crucible and annealed for more than 5 hours at a temperature somewhat (e.g., 25°C) below the softening point to remove strains. The resulting glass block is substantially homogeneous and bubble free and suitable for optical uses.

What is claimed is:

1. A method for the production of glass comprising;
    a. melting the constituents in a crucible to form a melt,
    b. maintaining the melt at an elevated temperature with a controlled atmosphere above the melt, the crucible being situated in a furnace,
    c. stirring the melt and
    d. cooling the melt characterized in that the controlled atmosphere is isolated from the furnace by the continual introduction of filtered gas of controlled composition into a partially enclosed chamber above the melt so that an outwardly flowing gas stream of linear velocity at least 10 feet per minute is maintained through a corridor at least one quarter of an inch long between the enclosed chamber and the furnace whereby the flow of contaminants from the furnace into the enclosed chamber is inhibited wherein the partially enclosed chamber and corridor are formed by suspending a skirted lid above the crucible, which skirted lid has an inner diameter more than one percent larger than the outer diameter of the crucible and which skirted lid is suspended by means of a hollow tube extending through the lid, which hollow tube additionally serves to introduce the filtered gas into the partially enclosed chamber.

2. A method of claim 1 in which the hollow tube is terminated at its lower end by a stirring member.

3. A method of claim 1 in which the gas stream has a linear velocity of at least 50 feet per minute.

* * * * *